United States Patent [19]

Akins

[11] Patent Number: 5,525,754
[45] Date of Patent: Jun. 11, 1996

[54] PREWIRED JUNCTION BOX

[75] Inventor: Charles S. Akins, Hoover, Ala.

[73] Assignee: Reddi-Box, Inc., Birmingham, Ala.

[21] Appl. No.: 120,659

[22] Filed: Sep. 13, 1993

[51] Int. Cl.$^6$ ..................................................... H01H 9/02
[52] U.S. Cl. ............................................ 174/53; 174/65 R
[58] Field of Search ........................................ 174/53, 65 R

[56] References Cited

U.S. PATENT DOCUMENTS

| | | | |
|---|---|---|---|
| 2,410,287 | 10/1946 | Jaberg | 174/53 |
| 2,433,917 | 1/1948 | McCartney | 174/53 |
| 2,920,303 | 1/1960 | Johnson | 439/411 |
| 3,052,748 | 9/1962 | Curtiss | 174/65 R |
| 3,885,852 | 5/1975 | Grove | 439/441 |
| 3,922,478 | 11/1975 | Perkey | 174/53 |
| 4,165,443 | 8/1979 | Figart et al. | 174/53 |
| 4,336,418 | 6/1982 | Hoag | 174/53 |
| 4,924,032 | 5/1990 | Akins | 174/53 |

Primary Examiner—Kristine L. Kincaid
Assistant Examiner—Michael J. Cornelison
Attorney, Agent, or Firm—Needle & Rosenberg

[57] ABSTRACT

A junction box for making electrical connections between an electrical cable and an electrical fixture is disclosed. It includes a housing having a plurality of parallel, spaced apart walls and an open front with at least one of the walls having a plurality of cable ports therethrough. Each port is capable of receiving an electrical cable having a plurality of cable wires. A plurality of parallel, spaced apart busses is disposed within the housing, each having a plurality of cable wire contact elements for making electrical connections with the cable wires, and each having at least one fixture-wire connector for making electrical connections with at least one of the wires from the electrical fixture. An attaching element is placed at each of the cable ports for attaching the cables to the junction box and for maintaining electrical connection between the cable wires and the busses. The busses are disposed in relation to the cable ports so that any standard electrical circuit can be constructed by inserting cables into predetermined cable ports and engaging the associated attaching element, and by inserting fixture-wires into predetermined fixture-wire connection members.

16 Claims, 7 Drawing Sheets

PREWIRED JUNCTION BOX

BACKGROUND OF THE INVENTION

1. Field of the Invention

The present invention relates to a prewired electrical junction box and, more particularly, to a prewired electrical junction box which allows various types of electrical connections to be made by inserting wires without requiring additional actions to make electrical connections.

2. Description of the Prior Art

Junction boxes, used for making electrical connections between various devices, are well established in the art of electrical wiring. They are primarily used for two purposes: making electrical connections between electrical service cables (cables connected to a central electrical service bus, such as a bus contained in an electrical breaker box) and electrical fixtures (e.g., switches, lamps and receptacles); and making electrical connections between primary electrical service cables which connect to an electrical service bus and secondary electrical service cables which distribute electrical service to various local circuits.

The conventional junction box comprises a housing of plastic or galvanized iron. It has cable ports in several of the walls through which pass the electrical cables to be connected. Cables are connected to electrical fixtures by connecting the ends of wires to the electrical fixtures and subsequently connecting the opposite ends of the fixture wires to service cable wires by twisting the wires together and securing them with a screw-type twist connector. Similarly, service cable connections can be made by inserting the cables to be connected into a junction box and connecting their respective wires with twist connectors.

The primary drawbacks of this type of junction box are that it requires the electrician to perform manual connection of the wires with twist connectors, which is a labor-intensive task and that it is easy to make improper (and sometimes dangerous) connections when connecting complex circuits or using inexperienced electrician's helpers.

Furthermore, conventional junction boxes require room for all of the necessary twist connectors and wires. The minimum dimensions of them are such that implementing a "multi-ganged" arrangement (e.g. where two switches or two receptacles are placed next to each other) requires the electrician to purchase a special multi-ganged to fit the arrangement under a standard face plate. Thus, using conventional junction boxes to implement multi-ganged arrangements significantly adds to the electrical contractor's costs.

Several prewired junction boxes which allow electricians to make wiring connections without having to manually twist-connect wires have been disclosed, such as U.S. Pat. Nos. 2,410,287; 2,433,917; 2,920,303; and 3,885,852. These patents disclose systems whereby special modular fixtures are plugged into single-purpose junction boxes, thereby reducing the labor required to implement an electrical circuit.

There are several disadvantages to these prior art devices: first, they require specially constructed fixtures (as opposed to industry-standard fixtures); second, they involve complex manufacturing processes; and third, their functionality is limited to only one operation. For these reasons, they have not found commercial success.

Other, more recent prewired junction boxes include U.S. Pat. Nos. 3,922,478; 4,165,443; and 4,336,418. These patents disclose systems containing electrical busses whereby electrical connections are made by inserting cables and special fixtures into the junction box.

These devices also have drawbacks that have limited their commercial success, including: requiring the use of specially-manufactured fixtures; not providing lateral support to the electrical service cables; and requiring reconfiguration of the internal busses to create many of the desired circuits.

U.S. Pat. No. 4,924,032 discloses a universal junction box with a plurality of internal busses for making all of the standard connections required in conventional electrical wiring. It allows the electrician to connect standard electrical circuits without manipulating the busses and it uses standard electrical fixtures, all without requiring twist connectors. Furthermore, it allows electrical service connections to be made by inserting electrical cables into openings in the box, both making connections with the busses and providing lateral support to the cables.

However, the '032 device connects the service cables by clamping onto the exposed conductive metal of the cable wires. It does not have a means to clamp onto the insulation of the cable jacket, therefore the lateral support to the cable is limited. Second, the method of connecting the service cable wires in the '032 structure restricts the electrician to choosing highly conductive (and, therefore, highly expensive) materials, such as copper, for wire conductors. Less expensive aluminum cannot be used because as current passes therethrough, the wire heats up; as it heats up it expands, forcing the connector to expand with it; when it cools down it contracts. However, the connector does not contract with it; therefore, when the wire is cool, it has a poor electrical connection. Third, its internal bus arrangement requires the use of expensive 4-wire cable in implementing a three-way switch; this is a disadvantage because 4-wire cable is more expensive than 3-wire cable and electricians prefer not to have to carry the added bulk of 4-wire cable in addition to the 3-wire cable they normally carry. Fourth, the polygonal shape of the box makes it impossible to connect several boxes together to form a "multi-ganged" arrangement, whereby boxes are placed next together to form dual switches and dual receptacles. Fifth, the arrangement of the busses next to the wall of the box made it so that the metal of energized wires is exposed, thus creating a potential safety hazard. Sixth, the wires are not automatically aligned with their respective busses, thus the electrician is required to perform the alignment task thereby increasing the cost of wiring to the electrical contractor.

As can be seen from the prior art, there exists a long-felt, unsolved need for a prewired junction box capable of safely and economically making all standard electrical connections using conventional, industry-standard fixtures.

SUMMARY OF THE INVENTION

The above-noted disadvantages of the prior art are overcome by the present invention, the prewired junction box (PJB), which allows an electrician to make every standard electrical connection by stripping the end of an electrical cable and inserting the cable into the cable ports on the side of the box. The cable wires are automatically aligned with their respective busses, therefore it is a self aligning junction box. All connections are made without having to use twist connectors. It is a universal junction box which also allows the electrician to connect every standard electrical fixture (including, but not limited to, switches, receptacles and lamps) to the cable wires by attaching one end of a fixture wire to the connection point of the fixture and inserting the other end of the wire through a fixture wire connector on the box.

Externally, the PJB has a housing with two parallel spaced apart side walls, two parallel spaced apart end walls, a back wall and an open front. At least one of the walls has a plurality of cable ports which can receive electrical cables, each cable having a plurality of cable wires, allowing the cable wires to make contact with the busses. The open front can receive any standard electrical device or a standard face plate. Internally, the PJB has a plurality of busses which allow an electrician to make any standard electrical connections by directly connecting wires from at least one electrical cable to either an electrical fixture or another cable via the busses.

Cables are secured to the PJB by attaching means. The attaching means have two functions: first, they laterally support the cables by gripping the insulative jacket around the cable and by wedging the wires in the cable against the busses; and second, in forcing the wires against the busses, they ensure that there is a good electrical contact between the wires and the busses. An attaching means comprises a locking member which passes through the cable port, and a locking surface on the wall of the PJB next to the cable port. The cable passes through a hole in the locking means, through the cable port in the wall. The locking means engages the locking surface when the electrician pushes it laterally toward the locking surface, wedging the cable between the wall and the locking means. The locking means also extends into the PJB, along with the wires of the cable, forcing the exposed wires against the busses when the locking means is engaged with the locking surface. This provides additional lateral support to the cable and ensures good electrical contact between the wires and the busses.

Once the locking means has engaged the locking surface no uninsulated wire is exposed outside of the box. Furthermore, the locking means can be easily disengaged by the electrician without causing harm to either the box or the wire. This allows the electrician to easily correct mistakes or change configurations at a minimal cost.

The PJB has three bus layers, with each layer containing at least one bus. When a 3-wire cable (such as a Romex electrical cable) is inserted into one of the cable ports in the wall of the PJB, the locking means directs each constituent wire to a separate bus layer, where it makes electrical contact with one of the busses at that layer. Each bus is dedicated to a specific purpose (e.g., for making "ground" connections, "hot" connections, etc.). The busses are arranged in the PJB so that an electrician can make any standard electrical connection by inserting common 3-wire cables in the cable ports, clamping down the attaching means, and attaching a standard electrical fixture (if needed).

The arrangement of the cable ports and the busses make it possible to chain together an undetermined number of junction boxes, allowing complex looping configurations. Looping occurs when several fixtures are connected in series. The present invention thus allows an electrician to connect several lamps, or other fixtures, together in series in only one circuit.

The compact arrangement of the busses allows the PJB to be constructed with narrower dimensions than conventional junction boxes. This allows for several junction boxes to be placed next to each other in a multi-ganged arrangement, attaching them to each other using common "C" clamps, while allowing the contractor to attach common cover plates with industry standard dimensions to the multi-ganged PJB.

The PJB can also have a clear cover which allows for easy inspection of the electrical connections inside the box. This feature makes wiring a safer process because the electrician is sure of the connections prior to energizing the circuit. Furthermore, it improves the efficiency and quality of the electrical inspection process.

It is, therefore, an object of this invention to provide a pre-wired junction box that allows an electrician to quickly and easily make any standard electrical service connection by inserting electrical cables into predetermined cable ports and gripping the cables with a connector attached to the box.

It is a further object of this invention to provide a prewired junction box that provides lateral support for the electrical service cables attached to the box.

It is a further object of this invention to provide a prewired junction box that allows an electrician to quickly and easily connect industry-standard electrical fixtures in any standard configuration by inserting fixture wires into predetermined holes in the box.

It is a further object of this invention to provide a prewired junction box that allows an electrician to implement multi-ganged arrangements by placing several boxes together, attaching them to each other with common "C" clamps and covering the combined arrangement with industry standard cover plates.

It is a further object of this invention to provide a prewired junction box that allows for easy inspection of the electrical connections made therein.

These and other objects will become apparent from the following description of the preferred embodiments taken in conjunction with the following drawings, although variations and modifications may be effected without departing from the spirit and scope of the novel concepts of the disclosure.

DETAILED DESCRIPTION OF THE PREFERRED EMBODIMENT

Figure 1:
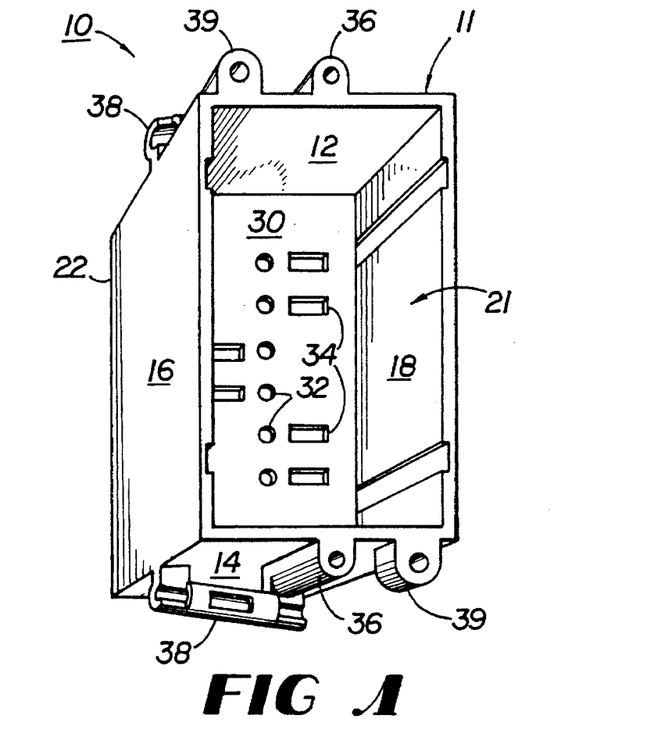
FIG. 1 is a front perspective view of the preferred embodiment of the prewired junction box of the present invention.

In the preferred embodiment, as shown in FIG. 1, the present invention 10 is a pre-wired junction box (PJB), which comprises a rectangular housing 11 with two parallel, spaced-apart end walls: a top wall 12; a bottom wall 14; two parallel, spaced-apart side walls: 16 and 18; a back wall 22, and a front side 20. The front wall 20 having a rectangular-shaped opening 21 therein. The opening 21 can receive therein any standard electrical fixture (including, but not limited to: switches, receptacles, lamps and faceplates). The housing can be made of any suitable material, including plastic and galvanized iron.

A front plate 30 is recessed from the front wall 20 and has a plurality of fixture-wire contact holes 32 therethrough for connecting wires from electrical fixtures to the PJB. Each hole 32 relates to a specific electrical configuration. The front plate 30 also has a plurality of rectangular fixture-wire release holes 34, one next to each fixture-wire contact hole 32, through which an electrician may insert the blade of a screwdriver to release a previously connected fixture wire. The front plate 30 is recessed to allow the back of an attached fixture (not shown) to fit into the housing 11. A pair of screw holes 36, one through the top wall 12 of the housing 11 and one through the bottom wall 14, are provided so that a fixture can be attached to the PJB by screwing it to the screw holes 36.

Nail guide means 38 are attached to the top wall 12 and the bottom wall 14. They are used for attaching the PJB to an ordinary mounting platform (not shown), which could include a common wall stud or an overhead joist. The PJB is attached to the mounting platform by placing the side wall 16 against the mounting platform and driving ordinary nails through the nail guide means 38 into the platform. The nail guide means 38 are directed inwardly toward side wall 16. The nails can be guided in a non-parallel manner so that the nails will be bent if the housing 11 is forced away from the mounting platform, thus increasing the force required to dislodge the PJB 10 from the platform. This feature makes the PJB 10 suitable for any application where greater attaching force is required (e.g., the mounting of overhead ceiling lamps).

Screw guide means 39 are also attached to the top wall 12 and the bottom wall 14 to mount the PJB to the mounting platform. This is an alternative method of mounting the PJB. The PJB can be constructed with either nail guide means or screw guide means, or both.

Figure 2A:
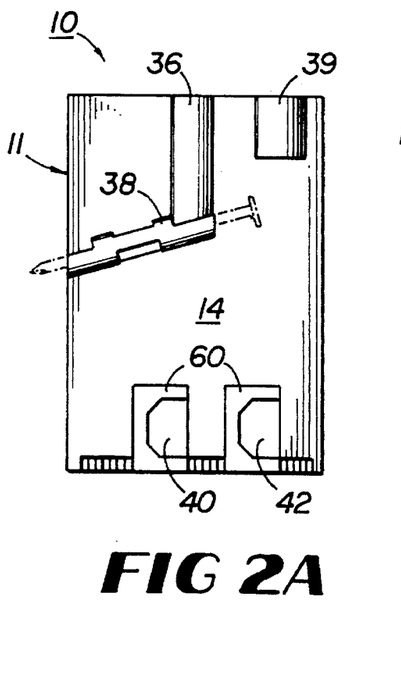
FIG. 2a is a bottom view of the box.

As shown in FIG. 2a, the bottom wall 14 of the housing has a nail guide means 38, a fixture-mounting screw hole 36, a screw guide means 39, and two cable ports 40 and 42 which allow electrical cables to pass into the housing 11. Cable port 40 is usually used for the incoming electrical service connection and cable port 42 is usually used for the outgoing electrical service connection, allowing subsequent junction boxes to have electrical service from the same circuit. The function of theses ports 40, 42 can be readily switched without any special action on the part of the electrician: cable port 42 can be used for the incoming electrical service connection and cable port 40 can be used for the outgoing electrical service connection.

Figure 2B:
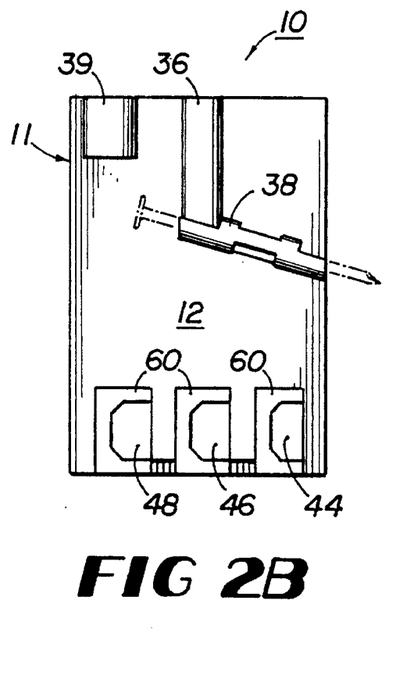
FIG. 2b is a top view of the box.

As shown in FIG. 2b, the top wall 12 has a nail guide 38, a fixture-mounting screw hole 36, a screw guide means 39, and three cable ports 44, 46 and 48 which are used primarily for making local fixture circuits. Cable ports 44 and 46 are primarily used for connecting two-way switched circuits, and cable port 48 is primarily used for connecting three-way switched circuits.

Figure 3:
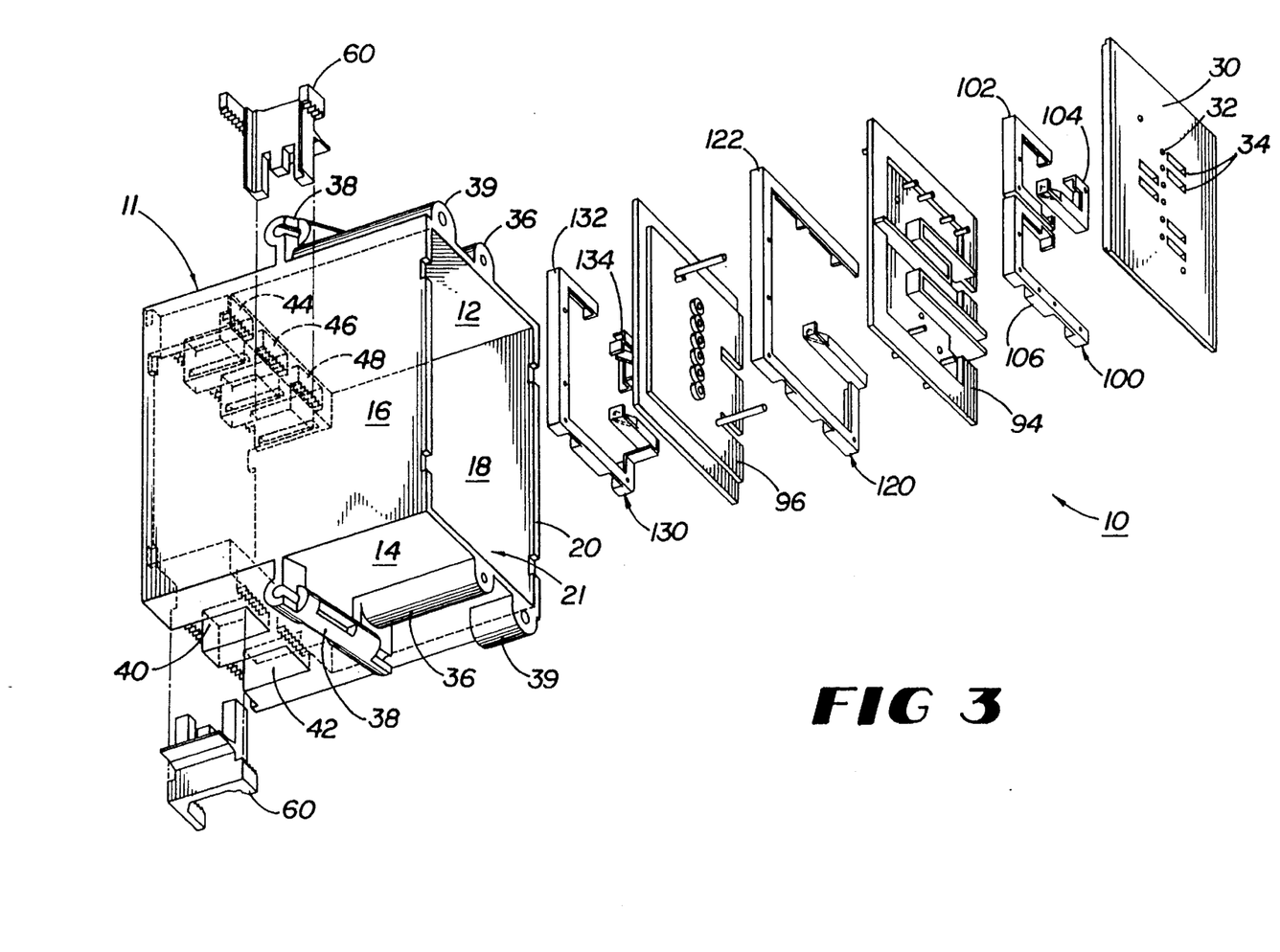
FIG. 3 is an exploded perspective view of the preferred embodiment of the present invention.

FIG. 3 shows an exploded perspective view of the invention. Disposed within the cavity 21 inside rectangular housing 11, is a plurality of parallel, spaced apart bus layers: a top bus layer 100, a middle bus layer 120, and a bottom bus layer 130. The bus layers are separated by non-conductive inserts 94 and 96. The top bus layer 100 and the bottom bus layer 130 comprise a plurality of co-planar busses. The middle bus layer 120 comprises a single bus. The top bus layer 100 comprises a switch bus 102, a travel bus 104 and a "hot? bus 106. The middle bus layer 120 comprises a ground bus 122. And the bottom bus layer 130 comprises a neutral bus 132 and a travel/switch bus 134. Disposed on the end walls 12 and 14 is a plurality of cable ports 40, 42, 44, 46 and 48 for receiving electrical cables. Associated with each cable port is a means 60 for attaching cables to the junction box and for maintaining electrical connection between cable wires and the busses.

Figure 4:
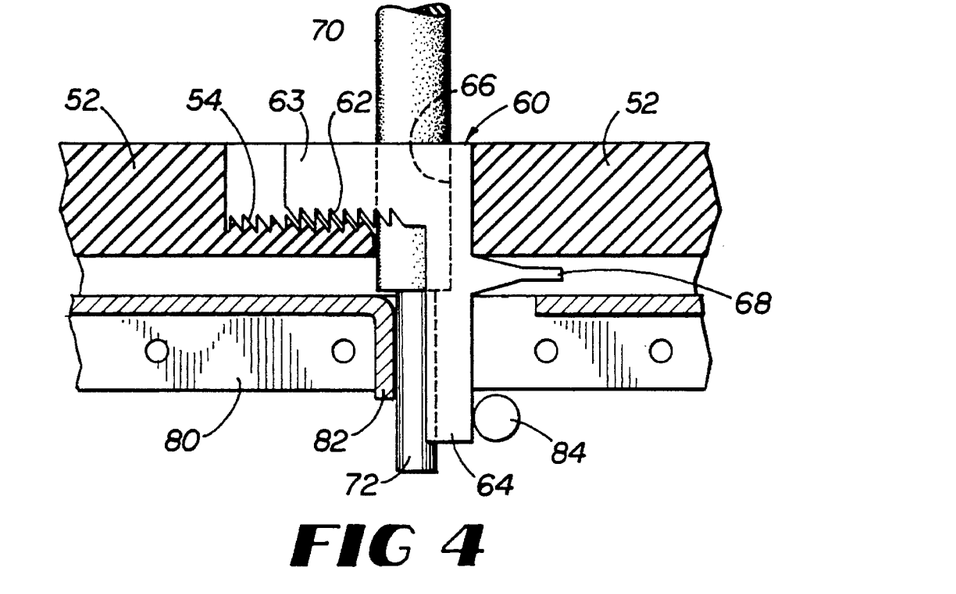
FIG. 4 is a cross-sectional view taken along lines 4—4 in FIG. 2b.

As shown in FIG. 4, a cable 70 is held in place in cable port 50 which comprises a first locking surface 54 disposed on the PJB wall 52 adjacent the port 50 and a moveable locking member 60 which passes through the cable port 50 and is engageable with the first locking surface 54. The locking member 60, when viewed from the side, is substantially L-shaped and comprises a body portion 64 with a hole 66 longitudinally extending therethrough for receiving an electrical cable 70. A projection 62 laterally extends from the body portion 64 and carries on its bottom a second locking surface 63 which is complementary in shape to, and matingly engageable with, the first locking surface 54. The illustrative embodiment shown in FIG. 4 has the first locking surface 54 and the second locking surface 63 in a sawtoothed configuration. However, in other embodiments, they may comprise any surfaces that are detachably engageable with each other.

An electrical connection is made between the exposed end of a wire 72 and one of the metal busses 80 inside the PJB 10. To make an electrical connection an electrical cable 70 is passed through the hole 66 in the locking member 60, with the exposed metal of the wires 72 (only one shown) being guided by the body portion 64 to a cable-wire contact means 82 attached to the bus 80. Once the wire has been properly placed, the electrician pushes the locking member 60 toward the first locking surface 54 so that the second locking surface 63 on the projection 62 engages the first locking surface 54 and grips the cable 70. Once the locking member 60 has engaged the first locking surface 54, the force of the locking member 60 and the wall 52 grips the cable, providing it with lateral support. The force of the body portion 64 pushes the wire 72 against the cable-wire contact means 82 and the bus 80. A guide post 84 acts as a fulcrum against the end of the body portion 64 to ensure that the forces are properly distributed between the cable 70 and the wire 72.

This method of connecting the wires to the busses has several advantages. One advantage is that the force of the body portion 64 against the wire 72 ensures good electrical contact between the bus 80 and the wire 72 on two surfaces, and also provides additional lateral support to the cable 70. Another advantage can be realized if the body position 64 is made of a resilient material (such as plastic) that expands with the wire as the wire expands (for instance as the wire heats up) and yet continues to apply force to the wire as it cools down, ensuring a constant electrical connection between the wire and the bus. This feature would allow the use of aluminum wire, which is cheaper than copper wire but more likely to heat up because of its higher resistance, in service connections.

Once the locking member 60 is engaged, a detent 68 extending from the body portion 64 on the side opposite from the lateral projection 62 and projecting between the bus 80 and the wall 52 prevents unintended access to the bus 80 through the cable port 50. The detent 68 also prevents the locking means from falling out of the PJB when no cable is engaged in the cable port 50.

Figure 5:
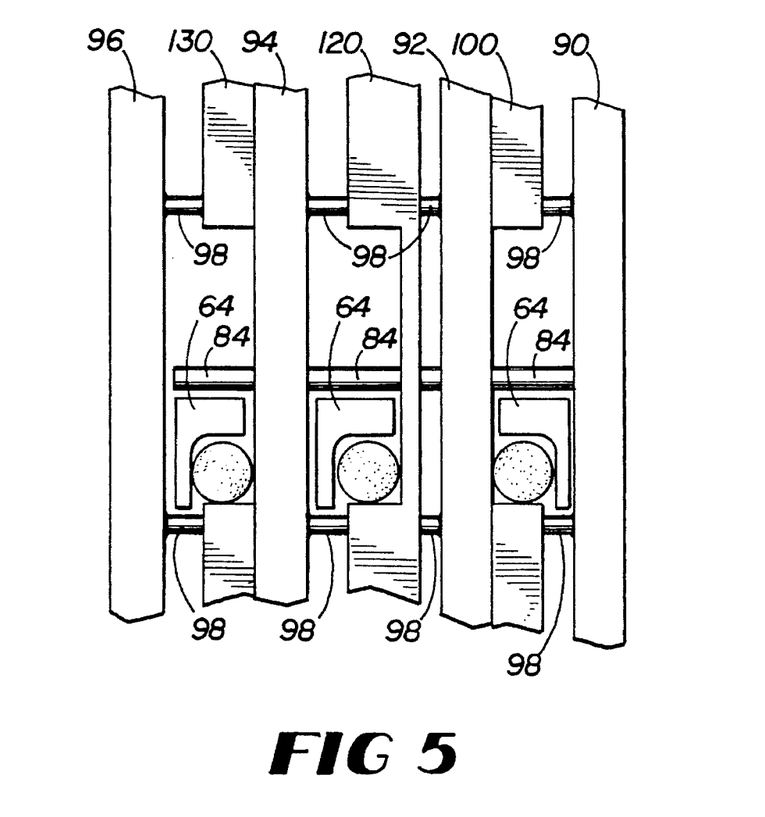
FIG. 5 is an end-view of the box showing three wires of a cable being pressed against the busses by the attaching means.

As shown in FIG. 5 the PJB, in this embodiment, comprises three electrical bus layers: a top bus layer 100, a middle bus layer 120, and a bottom bus layer 130. Each bus layer further comprises at least one conductive bus. The buses are supported by the back of the housing 90 and three non-conductive inserts: a first insert 92, a second insert 94 and a third insert 96. Each insert has a plurality of bus support posts 98 distributed around the bus to provide support for the bus and also for allowing free air space between the bus and the insert for efficient heat removal. There is also a guide post 84 for guiding the body portion 64. FIG. 5 also shows an inside end-view of the three wires 72 of a cable being pressed against the busses by the body portion 64. Alternative embodiments may have more or fewer bus layers.

Figure 6A:
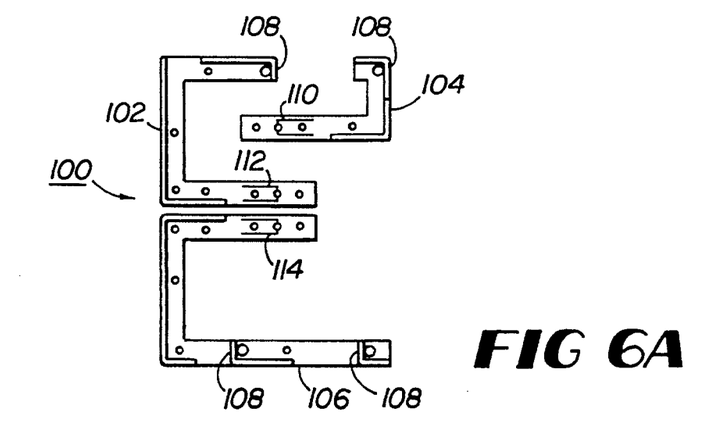
FIG. 6a is a top plan view of the busses of the upper bus layer.

As shown in FIG. 6a, the top bus layer 100 comprises three busses with each bus having a fixture-wire connection means 110–119 (of the type shown in FIG. 8a and discussed infra) that allows the electrician to connect fixtures to the bus. The "hot" bus 106 is for making electrical service connections to an energized wire with the hot fixture-wire connection means 114 for connecting the hot pole of a three-way switch to the bus. The switch bus 102 is for making switched electrical connections to a fixture with the switch fixture-wire connection means 112 for connecting the switch pole of a switch or a switched fixture to the bus. The travel bus 104 is for making three-way switched electrical connections to a fixture with the travel fixture-wire connection means 110 for connecting the travel pole of a fixture to the bus. In this embodiment, each bus layer has five cable-wire bus contact means 108 (of the type shown in FIG. 4 as cable wire contact means 82) which are aligned with the cable ports in the PJB housing. In other embodiments, each bus layer may have more or fewer bus contact means.

Figure 6B:
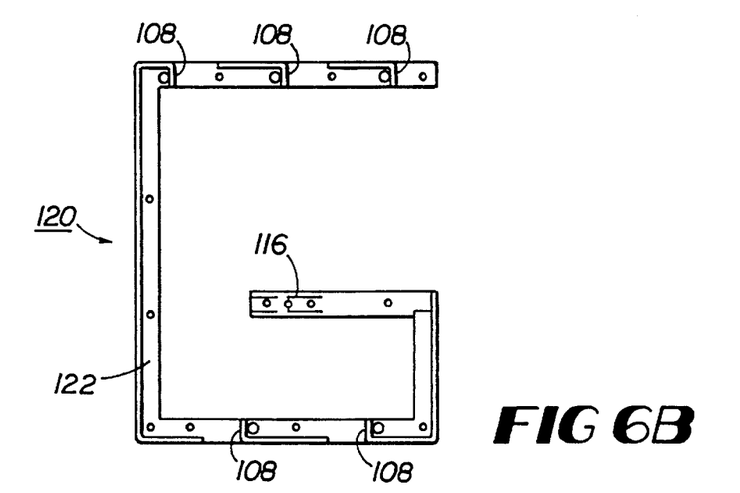
FIG. 6b is a top plan view of the buss of the middle bus layer.

As shown in FIG. 6b, the middle bus layer 120 has only one bus: a ground bus 122 with the ground fixture-wire connection means 116 for connecting the ground pole of a fixture to the bus. It is for making service and fixture connections to ground. As a safety feature of the PJB, the periphery of the ground bus 122 lies outside of the peripheries of all of the other busses. Because of this, the ground wire is always the first wire to be connected to the PJB and the last to be disconnected. This prevents an ungrounded circuit from ever being energized and thus reduces the occurrence of electrical shock.

Figure 6C:
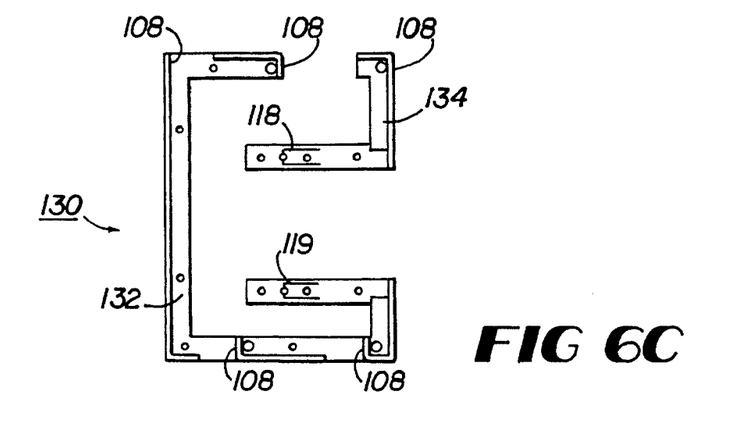
FIG. 6c is a top plan view of the busses of the bottom bus layer.

As shown in FIG. 6c, the bottom bus layer 130 has two busses: a neutral bus 132 for making electrical service connections to the neutral wire of a service or fixture cable with the neutral fixture-wire connection means 119 for connecting the neutral pole of a fixture to the bus; and a travel/switch bus 134 for making three-way switched electrical connections with the travel/switch fixture-wire connection means 118 for connecting the travel/switch pole of a three-way switch to the bus.

Figure 7:
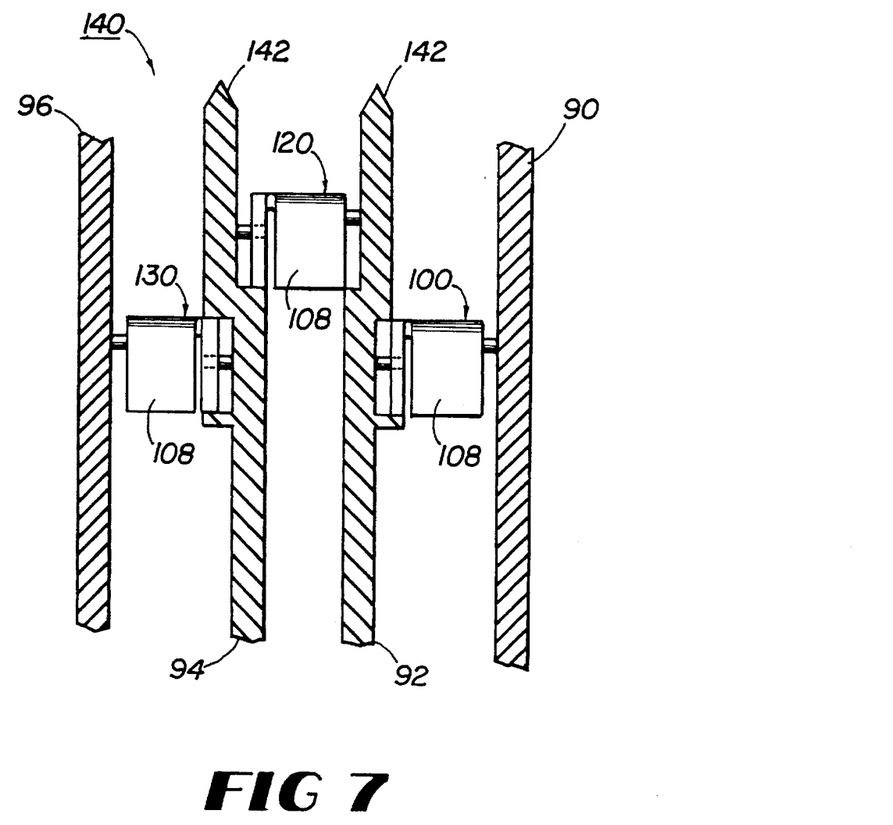
FIG. 7 is a side cross-sectional view of the three busses supported by the inserts at a point close to a cable port.

FIG. 7 shows a side cross-sectional view of the busses near a typical cable port 140. The first insert 92 and the second insert 94 end in guide points 142 to separate the wires in the cable and to guide them to their proper bus layers. This figure also shows how the busses 100, 120 and 130 are supported by the inserts 90, 92, 94 and 96.

Figure 8A:
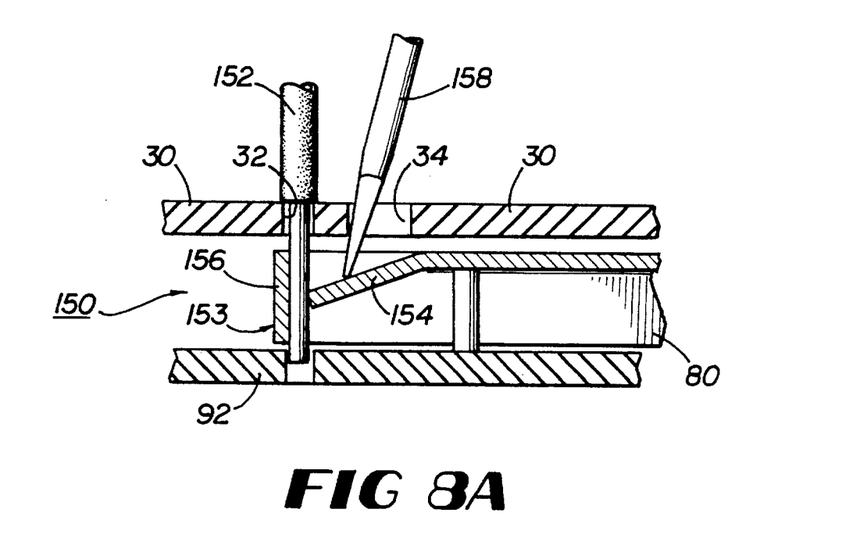
FIG. 8a is a side-view of a fixture wire engaged in the fixture wire connector of a bus.
Figure 8B:
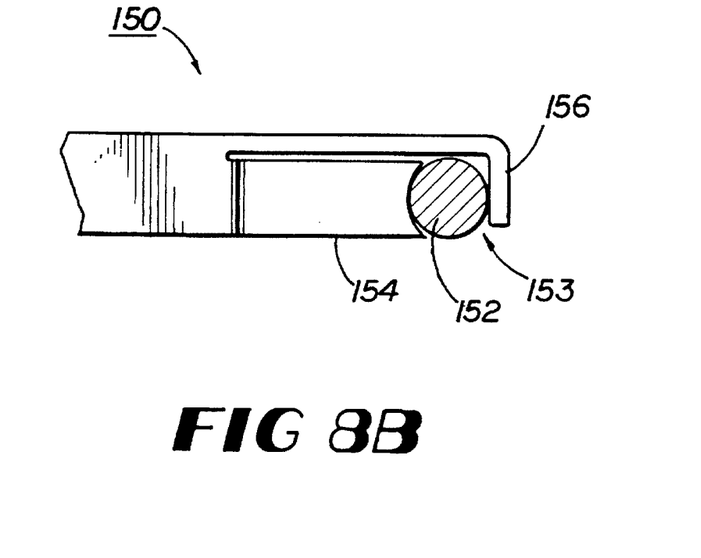
FIG. 8b is a top view of a fixture wire engaged in the fixture wire connector of a bus.

FIG. 8a shows a fixture-wire connection means 150 to the bus. All six of the busses have fixture-wire connection means 150 that protrude above the first insert 92 and are directly accessible through holes in the front surface 30. The fixture-wire connection means 150 comprises a frame 153 with a vertical wall 156 and a clamping member 154. To make a fixture connection, a fixture-wire 152 is inserted through one of the fixture-wire connection holes 32 in the front surface 30. It wedges through the space between a clamping member 154 and a vertical wall 156 formed at the end of one of the busses 80. To disengage the wire from the fixture-wire connection means 150, the electrician passes the blade of a screwdriver 158 through fixture-wire release hole 34 and presses down on the clamping member 154 freeing the wire 152. FIG. 8b shows a view of a fixture-wire 152 lodged in a fixture-wire connection means 150.

Figure 9:
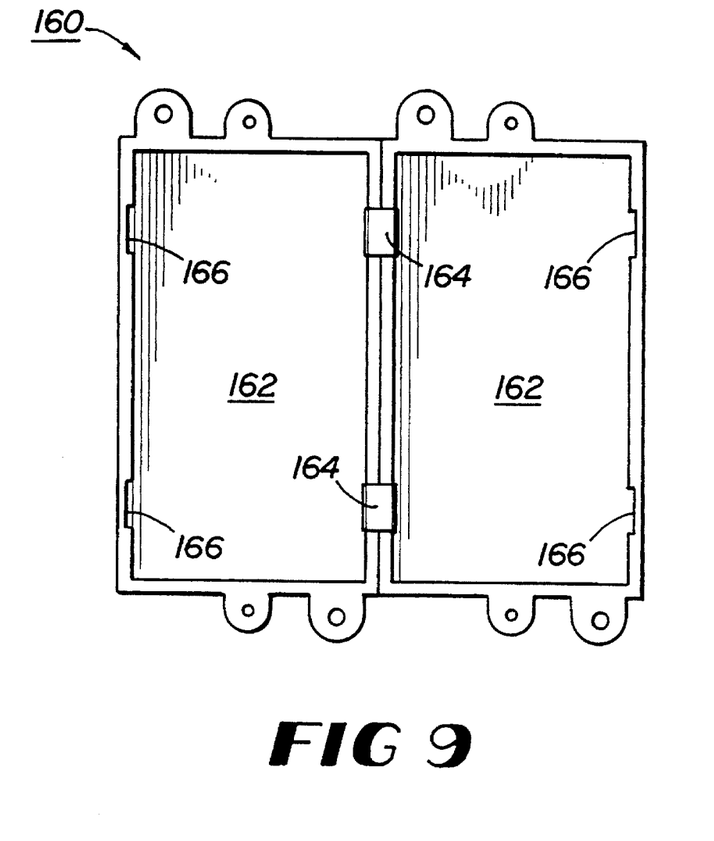
FIG. 9 is a front view of a 2-ganged configuration of the prewired junction boxes.

One embodiment of the prewired junction box has a rectangular housing so that it can be configured in several ways. As shown in FIG. 9, in one embodiment, two PJBs 162 are connected together to form a "two-ganged" arrangement 160. To do this, the two boxes are placed next to each other and clipped together using common "C" clamp connectors 164 placed in special slots 166 formed in the walls of the PJB.

Figure 10A:
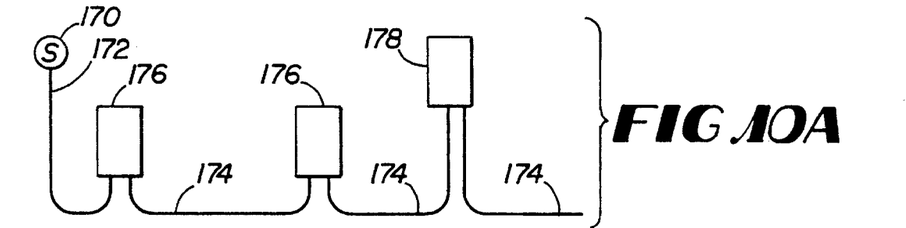
FIG. 10a is a schematic view of a standard non-switched lamp and receptacle circuit constructed from the prewired junction boxes of the present invention.
Figure 10B:
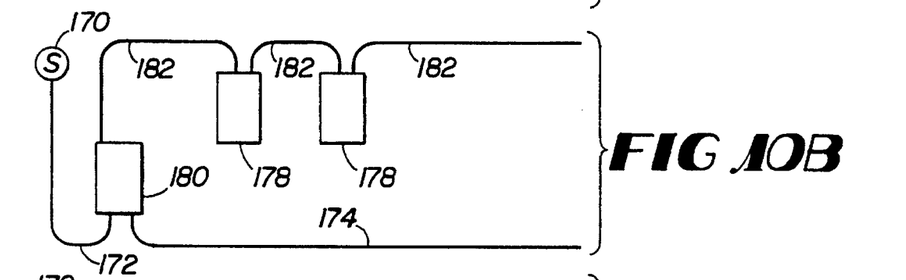
FIG. 10b is a schematic view of a single-pole switched lamp circuit constructed from PJBs.

FIGS. 10a–10b show various common circuits that can be constructed using PJBs. FIG. 10a shows a standard non-switched lamp and receptacle circuit constructed from PJBs. A power source 170 (typically 125 V, 20 A, AC in the U.S.A.) supplies power to a service line 172 which supplies a receptacle 176. A continuing service line 174 supplies other devices, which in this example include another receptacle 176 and a lamp 178.

FIG. 10b shows a single-pole switched lamp circuit constructed from PJBs. In this example, the service line 172 supplies power to a single-pole switch 180. A switched power line 182 supplies one or more lamps 178.

Figure 10C:
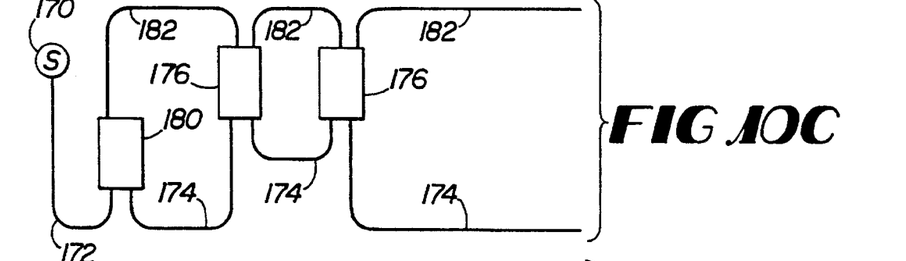
FIG. 10c is a schematic view of a single-pole switched receptacle circuit constructed from PJBs.

FIG. 10c shows a single-pole switched receptacle circuit constructed from PJBs. In this example, the switched power line 182 from the switch 180 supplies the top half of one or more receptacles 176. The bottom halves of the receptacles 176 being supplied by the continuing service line 174 from the switch 180.

Figure 10D:
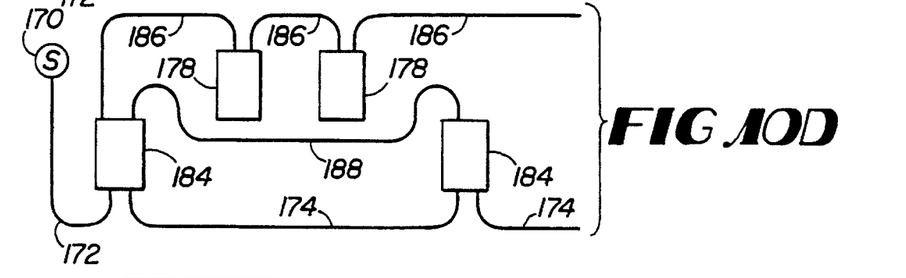
FIG. 10d is a schematic view of a three-way switched lamp circuit constructed from PJBs.

FIG. 10d shows a three-way switched lamp circuit constructed from PJBs. The service line 172 supplies a three-way switch 184. The continuing service line 174 supplies another three-way switch 184. A travel-ground-travel/switch line 188 connects the travel-ground-travel/switch busses of the two PJBs holding the switches 184. The three-way switch line 186 from the first switch 184 supplies one or more ordinary lamps 178.

Figure 10E:
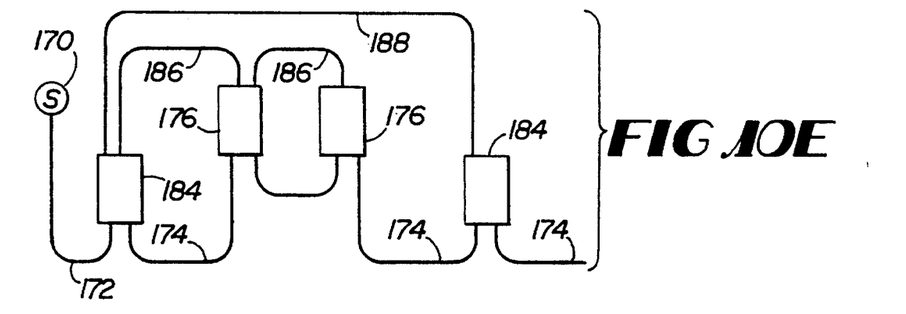
FIG. 10e is a schematic view of a three-way switched receptacle circuit constructed from PJBs.

FIG. 10e shows a three-way switched receptacle circuit constructed from PJBs. In this example, the three-way switch line 186 supplies the top half of one or more receptacles 176, with the bottom halves of the receptacles 176 being supplied by the continuing service line 174 from the switch 184.

The above embodiments are given as illustrative examples and are not intended to impose any limitations on the invention. It will be readily appreciated that many deviations may be made from the specific embodiments disclosed in this specification without departing from the invention. Accordingly it is intended to cover all such modifications as within the scope of this invention.

What is claimed is:

1. A junction box for making electrical connections between an electrical cable and an electrical fixture, comprising:

a. a rectangular housing having two parallel, spaced apart side walls, two parallel, spaced apart end walls, a back wall and a front wall having an opening, thereby forming a cavity, wherein at least one of the walls has a plurality of cable ports therethrough, each port capable of receiving an electrical cable having a plurality of cable wires;

b. a plurality of parallel, spaced apart busses disposed within the cavity, each having a plurality of cable wire contact means for making electrical connection with the cable wires, and each having at least one fixture-wire connection means for making electrical connections with at least one of the wires from the electrical fixture; and c. a means, at each of the cable ports, for attaching the cables to the junction box and for maintaining electrical connection between the cable wires and the busses;

wherein the busses are disposed in relation to the cable ports so that any standard electrical circuit can be constructed by inserting cables into predetermined cable ports, engaging the associated attaching means, and inserting fixture-wires into predetermined fixture-wire connection means.

2. The junction box of claim 1 wherein the attaching means further comprises:

a. a first locking surface integrated onto the wall of the housing next to each cable port; and b. a locking member having a second locking surface which is complimentary to the first locking surface and which passes through each cable port, for gripping the electrical cable by holding it in contact with the wall and for electrically connecting the wires of the cable with the busses by pressing the wires against the busses, when the locking surfaces are in engagement with each other.

3. The junction box of claim 2 wherein the locking member further comprises:

a. a body portion; and b. a projection laterally extending from the body portion, having a hole longitudinally extending therethrough for receiving the electrical cable, upon which is carried the second locking surface in opposed relationship to the first locking surface so that the engagement of the second locking surface at a predetermined location on the first locking surface positions the wires through the opening so that it is axially parallel to at least a portion of the length of the body portion whereby the exposed end of the wires is disposed between the body portion and one of the busses.

4. The junction box of claim 3 wherein the locking member is substantially L-shaped.

5. The junction box of claim 4 wherein the first locking surface and the second locking surface comprise sawtoothed surfaces.

6. The junction box of claim 3 wherein the locking means further comprises a means for guiding the wires of the cable so that each wire is in contact with only one of the busses.

7. The junction box of claim 3 wherein the locking means further comprises a detent extending from the body portion on the side opposite from the projection between one of the busses and the wall, thereby preventing access to the bus through the port when the locking member is engaged with the first locking surface.

8. The junction box of claim 1 wherein the fixture-wire connection means further comprises:

a. a frame having at least one vertical wall for making electrical contact with one of the wires; and b. a clamping member adjacent to the vertical wall and having a flexible portion, with a proximal end and a distal end, that is moveable between a first position, whereby the distal end is substantially perpendicular to the vertical wall; and a second position, whereby the distal end is deflected downward by the passage of one of the wires between the vertical wall and the distal end, thereby making electrical contact between the clamping member, the wire and the vertical wall.

9. The junction box of claim 1 wherein each bus has a non-planar surface and a plurality of cable wire contact points thereon, wherein a contact point is disposed next to each of the cable ports for making electrical contact with the wires of an electrical cable.

10. The junction box of claim 9 wherein the contact points comprise perpendicular bends in the metal of each bus for contacting the wires on two sides.

11. The junction box of claim 1 wherein the plurality of busses comprise:

a. a bottom layer;

b. be a top layer; and c. a middle layer disposed therebetween;

wherein the junction box further comprises a substantially nonconductive insert supporting and separating each of the layers.

12. The junction box of claim 11 wherein the plurality of busses further comprise:

a. a neutral bus disposed on the bottom layer for connecting the neutral wire of an electrical service cable to the neutral wires of other electrical service cables and electrical devices;

b. a travel/switch bus disposed on the bottom layer adjacent to the neutral bus for connecting the travel/switch pole of a 3-way switch to the travel/switch wire of an electrical cable configured to implement a 3-way switched circuit;

c. a ground bus disposed on the middle layer for connecting the ground wire of an electrical service cable to the ground wires of other electrical service cables and electrical devices;

d. a hot bus disposed on the top layer for connecting the hot wire of an electrical service cable to the hot wires of other electrical service cables and electrical devices;

e. a switch bus disposed on the top layer adjacent to the hot bus for connecting the switch pole of a switch to the switch wire of an electrical cable configured to implement a switched circuit; and f. a travel bus disposed on the top layer adjacent to the switch bus for connecting the travel pole of a 3-way switch to the travel wire of an electrical cable configured to implement a 3-way switched circuit.

13. The junction box of claim 12 wherein the ground bus is disposed about all of the other busses so that the ground bus is the first to be connected to the cable and the last to be disconnected, thus ensuring that an ungrounded circuit cannot be energized.

14. The junction box of claim 1 further comprising nail guide means attached to the outside of opposing walls of the housing and projecting downwardly toward the back wall of the housing for guiding securing devices used to attach the junction box to a mounting platform.

15. The junction box of claim 1 further comprising nail guide means attached to the outside of opposing walls of the housing and projecting toward a side wall of the housing for guiding securing devices used to attach the junction box to a mounting platform.

16. A prewired junction box for making electrical connections, comprising:

a. a housing having a plurality of walls, at least one of which has a plurality of electrical cable ports;

b. a plurality of electrically conductive busses disposed therein, arranged so that wires of electrical cables can be attached to them at predetermined points, thereby completing any standard electrical circuit configuration; and c. means for attaching the electrical cables to the housing so that the wires of the cables are directed to a predetermined plurality of the busses and placed into electrical contact therewith when the attaching means is engaged, wherein the means for attaching electrical cables can be engaged by laterally moving the attaching means in one direction, and then subsequently disengaged while maintaining the condition of the junction box and the wires, even after multiple engagements and disengagements.

* * * * *